Figure 1:
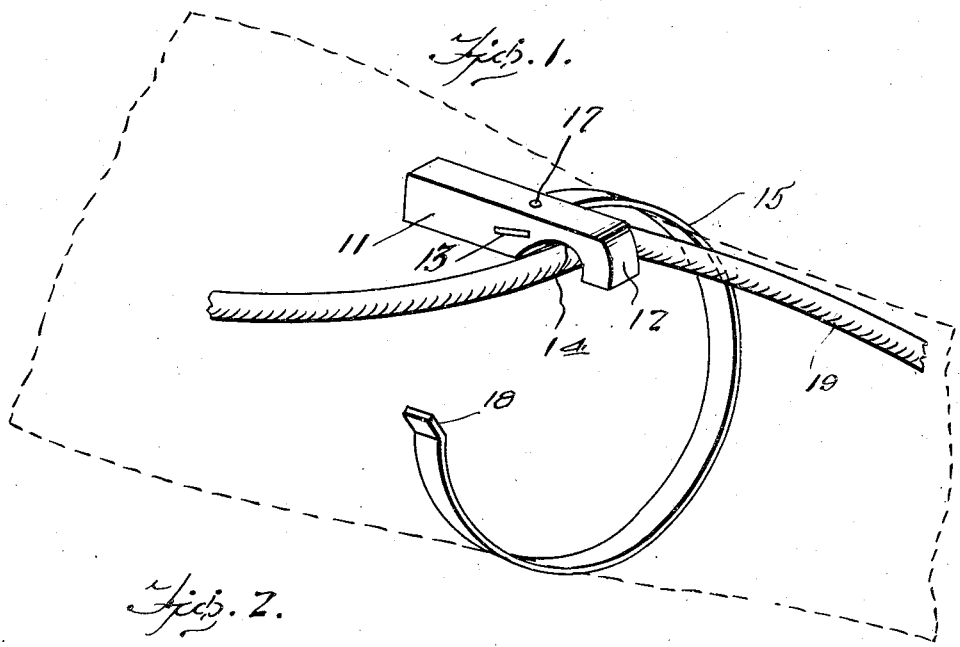

Oct. 28, 1941.   B. ANDERSON   2,261,046

ELECTRICAL APPLIANCE CORD HOLDE

Filed June 15, 1939

Inventor
Bryan Anderson
By L. F. Randolph
Attorney

Patented Oct. 28, 1941

2,261,046

UNITED STATES PATENT OFFICE 2,261,046

ELECTRICAL APPLIANCE CORD HOLDER

Bryan Anderson, Billings, Mont.

Application June 15, 1939, Serial No. 279,365

4 Claims. (Cl. 248—51)

This invention relates to a holder for electrical appliance cords and is particularly adapted for use with manually operated electrical appliances for engaging and holding a portion of the appliance cord or flexible conductor.

More particularly, it is an object of this invention to provide an article adapted to be removably mounted on an arm and having a notch or recess through which an electrical appliance cord is passed and frictionally held, intermediate of its ends, so that the cord will not interfere with the normal use of the appliance.

More particularly, it is an aim of this invention to provide a device for holding an intermediate portion of an electric cord while said cord is attached to an electric iron, hair clippers, a shaver or the like, to keep the cord out of the way of the operator of the appliance.

Other objects and advantages of the invention will hereinafter become more fully apparent from the following description of the drawing, which illustrates a preferred embodiment thereof, and wherein—

Figures 2, 3:
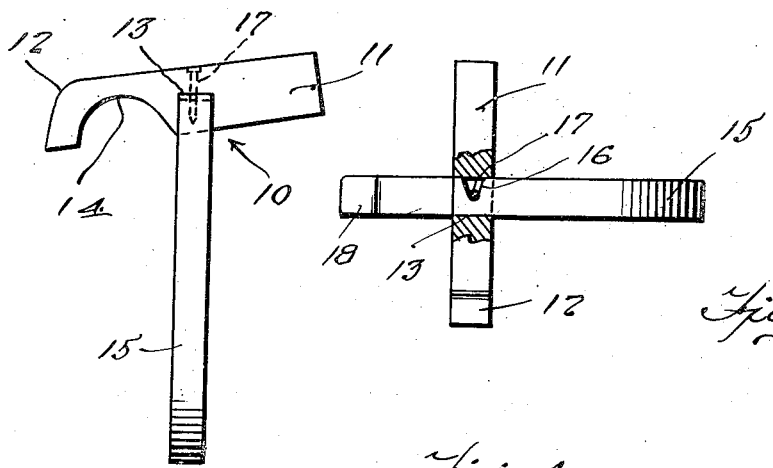
Figure 4:
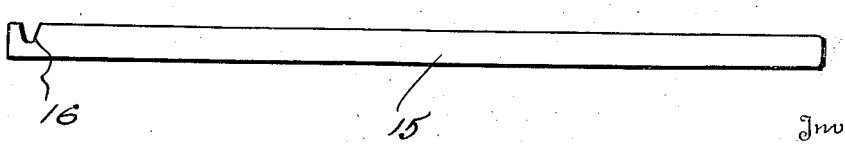

Figure 1 is a perspective view showing the appliance cord holder in position on the right forearm and engaging the intermediate portion of a flexible electric conductor, Figure 2 is a side elevational view of the conductor holder, Figure 3 is a plan view, partly in section, of the same, and Figure 4 is a plan view of the spring clip before being shaped.

Referring more particularly to the drawing, wherein like reference characters designate like or corresponding parts throughout the different views, 10 designates generally the holder comprising the invention which includes an elongated block 11 having a rounded forward end 12. Block 11 is provided intermediate of its ends with a slot 13 which extends transversely therethrough and which is disposed obliquely to its top and bottom surfaces and which is inclined toward the forward end 12. Block 11 is provided with a recess or notch 14 in its bottom surface adjacent the forward end 12.

A spring clip 15 is formed from a relatively thin strip of resilient metal, as seen in Figure 4, which is bent and shaped into a curved or arcuate form, as seen in Figure 1. Adjacent one end, clip 15 is provided with a notch 16 which opens outwardly of one of its longitudinal edges. This end of the clip 15 is mounted in the slot 13 and is secured thereto by means of a small brad or driven fastening 17 which extends partially through the block 11, through its slot 13 and through the inner end of the notch 16, as best seen in Figure 3, to secure one end of the clip 15 to the block 11. The opposite free end of the clip 15 is flared outwardly as at 18.

Holder 10 is adapted to be applied, as for example, to the right arm, as indicated in dotted lines in Figure 1. To apply the holder 10, the wrist of the right arm is passed through the space between the end 18 of the clip 15 and the block 11 after which the holder 10 is moved toward the elbow until it is in tight engagement with the enlarged portion of the forearm. Block 11 is positioned on the upper side of the arm with the forward end 12 extending toward the wrist and with the flared free end 18 on the outer side of the arm. A flexible electric conductor or appliance cord, a portion of which is shown in Figure 1, designated 19, is adapted to be passed through the notch or recess 14, inwardly or toward the operator, and to extend along the upper side of the right arm to the appliance, not shown, which is adapted to be held and operated by the right hand. Clip 15 by being secured at an angle to the block 11, by means of the slot 13, urges the forward end 12 downwardly or inwardly against the arm to frictionally hold the cord 19 in adjusted position therein so that the slack portion of the cord 19 will be held on the outer side of the arm to prevent it from interfering with the appliance to which it is connected and to hold it out of contact with possible obstructions adjacent to which the appliance is being used.

If desired, the holder 10 may be mounted on the left arm with the block 11 on the upper side thereof and with the flanged end 18 on the inner side of the arm; or clip 15 may be inserted through the opposite side of slot 13 so that when applied to the left arm end 18 will be on the outer side. If desired, holder 10 may be mounted on the arm above the elbow with the forward end 12 extending toward the wrist.

Various modifications and changes are contemplated and may be resorted to so long as they fall within the spirit and scope of the invention as hereinafter defined by the appended claims.

I claim as my invention:

1. An attachment for use with flexible electrical conductors comprising a block having a transverse slot intermediate of its ends, said slot being inclined toward the forward end of said block, a resilient arcuately shaped member having one end fixed in said slot for releasably mounting the block on the arm of the user, and said block being provided with a recess in its underside and adjacent its forward end for engaging a portion of a flexible electrical conductor, said inclined slot co-acting with said resilient member for urging the forward end of the block downwardly to frictionally hold the conductor between the arm and block.

2. An electrical appliance cord holder comprising a block having a transverse slot intermediate of its ends and inclined toward one end thereof, a resilient clip having a notch adjacent one of its ends, said end being mounted in said slot, a fastening mounted in said block and extending through the slot and notch to connect the clip and block, and the aforementioned end of said block being provided with a recess in its bottom for receiving a portion of an electrical appliance cord.

3. A device for holding an electrical appliance cord relatively to a user's arm, comprising an elongated block provided with a recess in its underside and adjacent its forward end, and an arcuately shaped spring clip having one end secured to said block intermediate of the ends of the block, said clip being disposed transversely to the block and being adapted to engage an arm of a person for yieldably mounting the block longitudinally thereon, with the underside of the block in contact with the arm, said recess being adapted to receive an electrical appliance cord to be frictionally held, relatively to the arm, between the block and arm.

4. A device as in claim 3, the connected end of said spring clip being twisted relatively to its free end for urging the forward end of the block downwardly and into tight frictional engagement with the arm for securely retaining the electrical appliance cord relatively thereto.

BRYAN ANDERSON.